US008534505B2

(12) United States Patent
Romanin et al.

(10) Patent No.: US 8,534,505 B2
(45) Date of Patent: Sep. 17, 2013

(54) LIQUID MATERIAL DISPENSER

(75) Inventors: Mario Romanin, Valley City, OH (US); Brian Burkley, Duluth, GA (US); Les Varga, Cumming, GA (US); Chuck Ganzer, Cumming, GA (US); Jeff Owen, Suwanee, GA (US)

(73) Assignee: Nordson Corporation, Westlake, OH (US)

( * ) Notice: Subject to any disclaimer, the term of this patent is extended or adjusted under 35 U.S.C. 154(b) by 833 days.

(21) Appl. No.: 12/550,730

(22) Filed: Aug. 31, 2009

(65) Prior Publication Data

US 2010/0065585 A1  Mar. 18, 2010

Related U.S. Application Data

(60) Provisional application No. 61/096,997, filed on Sep. 15, 2008.

(51) Int. Cl.
  *G01F 11/04* (2006.01)
(52) U.S. Cl.
  USPC .................. 222/250; 222/282; 222/389
(58) Field of Classification Search
  USPC ............ 222/249, 251, 250, 219, 63, 333, 222/334, 367, 368, 135, 136, 386, 389, 134, 222/282
  See application file for complete search history.

(56) References Cited

U.S. PATENT DOCUMENTS

| 4,055,281 | A | * | 10/1977 | Rosen et al. | 222/309 |
| 4,162,750 | A | * | 7/1979 | Demers et al. | 222/250 |
| 4,340,159 | A | * | 7/1982 | Garrett | 222/389 |
| 4,834,268 | A | * | 5/1989 | Keller | 222/327 |
| 5,556,007 | A |  | 9/1996 | Breitsprecher | |
| 5,687,815 | A |  | 11/1997 | Antila et al. | |
| 6,398,514 | B1 |  | 6/2002 | Smith et al. | |
| 6,840,404 | B1 |  | 1/2005 | Schultz et al. | |
| 8,220,660 | B2 | * | 7/2012 | Smith | 222/57 |
| 2008/0142552 | A1 | * | 6/2008 | Hemsen et al. | 222/334 |
| 2009/0321475 | A1 |  | 12/2009 | Schultz | |

FOREIGN PATENT DOCUMENTS

| EP | 0851217 |  | 7/1998 |
| GB | 2214489 | A * | 9/1989 |
| GB | 2377425 |  | 1/2003 |
| WO | 2006003363 |  | 1/2006 |

OTHER PUBLICATIONS

European Search Report for European Patent Application No. 09169319 dated Mar. 22, 2012.
Fluidic Systems product information, Feb. 2002.

(Continued)

*Primary Examiner* — Paul R Durand
*Assistant Examiner* — Donnell Long
(74) *Attorney, Agent, or Firm* — Calfee, Halter & Griswold LLP

(57) ABSTRACT

Methods and apparatus for dispensing liquid material provide the option to dispense precise and repeatable quantities or volume of material over a wide range of viscosities. In one embodiment, a metering chamber is provided that can be filled and emptied at the same time so as to eliminate time delays between dispensing operations. The material may be under pressure and that pressure is used to fill and empty a metering chamber. In another embodiment, a control device is provided with a metering chamber wherein the control device operates to switch pressurized fluid between two passages to the metering chamber. In a more specific embodiment, the control device may be, for example, a valve, and more specifically in one embodiment a pneumatically actuated spool valve.

37 Claims, 9 Drawing Sheets

(56) References Cited

OTHER PUBLICATIONS

Graco Liquid Control Product Lines product information, http://www.graco.com/LLC/products/productlines.html, at least as early as Nov. 5, 2006.

Meter Mix Dispense Systems product information, Sealant Equipment & Engineering, Inc., http://www.sealantequipment.com/2partdispensesys.htm, at least as early as Jul. 1, 2007.

* cited by examiner

200~# LIQUID MATERIAL DISPENSER

TECHNICAL FIELD OF THE DISCLOSURE

The disclosure relates generally to apparatus and methods for dispensing liquid material. More particularly, the disclosure relates to apparatus and methods that can dispense liquids, for example, over a wide range of viscosities.

BACKGROUND OF THE DISCLOSURE

Many different types of dispensing apparatus are used for dispensing liquids. Known systems such as ejector guns typically operate by filling a chamber with material then dispensing or ejecting that material, for example as a daub of material, onto a surface. After the material is dispensed there is a minimum time delay to re-fill the chamber before the next dispensing operation. This delay can be significant, particularly for higher viscosity materials. Known systems also have significant variations in the volume of material dispensed with each dispensing operation.

SUMMARY OF THE DISCLOSURE

Methods and apparatus for dispensing liquid material are provided. The methods and apparatus provide the option to dispense precise and repeatable quantities or volume of material over a wide range of viscosities, even though viscosity may change such as due to temperature changes during equipment operation and so on. In one embodiment, a metering volume is provided that may be filled and emptied at the same time so as to eliminate time delays between dispensing operations. In a specific exemplary embodiment, the material being dispensed is under pressure and that pressure is used as motive force to fill and empty a metering chamber. In another embodiment, a directional control device is provided with a metering chamber wherein the directional control device operates to switch pressurized fluid between two passages to the metering chamber, for example, in an alternating or sequential manner. In a more specific embodiment, the directional control device may be, for example, a valve, and more specifically in one embodiment a spool or slide valve. In still another embodiment, a spool or slide valve operates in part in response to fluid pressure from the fluid being controlled by the spool valve.

These and other aspects and advantages of the inventions disclosed herein will be readily apparent to those skilled in the art from a reading of the following detailed description of the exemplary embodiments in view of the accompanying drawings.

DETAILED DESCRIPTION OF THE EXEMPLARY EMBODIMENTS

1. Introduction

Figure 1:
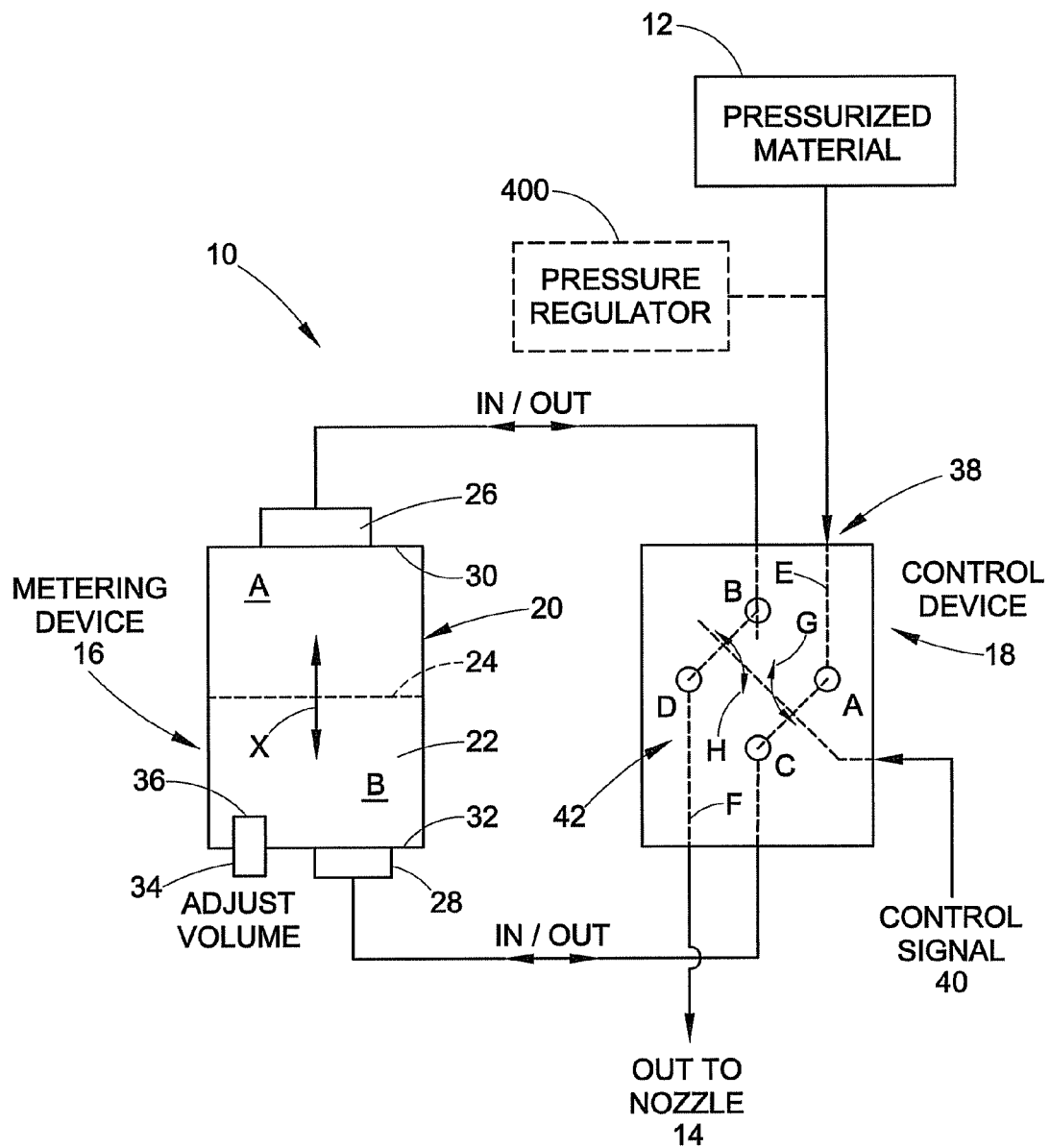
FIG. 1 is a simplified schematic of an embodiment of a dispensing apparatus in accordance with the inventive aspects of the present disclosure.

The present disclosure is directed to apparatus and methods for dispensing liquid material. The term "dispensing" as used herein refers to the concept of applying, depositing or ejecting liquid material. For example, liquid material may be dispensed onto a surface or for mixing with other materials and liquids, and may include dispensing liquid material in discrete quantities (in some applications referred to as daubs of material) or in more continuous or near continuous dispensing operations. While the various embodiments herein illustrate a single dispensing apparatus, it will be appreciated that two or more of the dispensers may be clustered or grouped together to dispense liquid material in a pattern, a sequence, or for mixing multiple constituents. The term "metering" and variations thereof herein refers to idea that a known, selectable or adjustable volume or amount of material may be dispensed regardless of the rate that material is dispensed and independent of viscosity changes.

While the inventions are described and illustrated herein with particular reference to various specific forms and functions of the apparatus and methods thereof, it is to be understood that such illustrations and explanations are intended to be exemplary in nature and should not be construed in a limiting sense. For example, the inventions may be utilized in any material dispensing system involving the application of liquid material to a surface, whether the dispensing apparatus is stationary or moving, and whether the surface is stationary or moving. The inventions are not limited to any particular type of liquid or liquefied mixture and may include suspensions, slurries and so on. The surface need not be a specific type of surface or material, and may be an interior or exterior surface, and may include generally planar, curvilinear and other surface geometries, end surfaces, and so on. The inventions will find application outside of applying liquid material to a surface. For example, dispensing apparatus may be used for mixing two or more liquid components.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

2. Detailed Description

With reference to FIG. 1, an exemplary embodiment of a dispensing apparatus 10 in accordance with the present disclosure is illustrated. The dispensing apparatus 10 is useful for dispensing liquid material provided from a source 12 to an outlet 14. The dispensed material may be applied to a surface or mixed with other materials or liquids, for example, or used for other purposes or with other processes and apparatus. The dispensing apparatus 10 is especially useful for high viscosity liquids, even as high as eight million centipoises or more, but will find application for liquids having lower viscosities, even down to one centipoises or water. The apparatus and methods disclosed herein also provide repeatable control of the volume or amount of the liquid material dispensed with each dispensing operation.

The apparatus 10 may include a metering or quantity dispensing device 16, and a control device 18. The metering device 16 comprises a metering or dispensing chamber 20 that defines a metering volume 22 (the chamber volume is also labeled and referred to herein as "C") enclosed within the chamber 20. The control device 18 primarily functions to direct pressurized liquid material being dispensed to the dispensing or metering device 16 and to control flow from the metering device 16, for example, with respect to two passages in fluid communication with the metering device 16, in an alternating manner. The control device 18, therefore, is also referred to herein as a directional control device 18. The chamber 20 may be, for example, generally cylindrical although other geometries may be used as needed. A dispensing member 24 is disposed in the chamber 20 and is adapted to move back and forth along an axis X. In one embodiment, the dispensing member 24 may be realized in the form of a piston. The metering volume 22 establishes a metered amount of material that is dispensed for each dispensing operation. The metered volume, in practical terms, is the volume of the chamber 20 less the volume of the dispensing member 24. By "directional" is meant that the control device 18 operates to direct the flow of pressurized liquid material into and out of the chamber 20. For purposes of discussion herein, a "dispensing operation" is one in which liquid material is dispensed as the result of a single stroke of the dispensing member 24. However, this reference is only for convenience, as a dispensing operation in toto may comprise two or more sequential strokes of the dispensing member 24.

The chamber 20 includes a first or upper passage 26 and a second or lower passage 28. Each passage 26, 28 functions in an alternating manner as an inlet and an outlet for material flowing into and out of the chamber 20. The two passages, however, operate 180° out of phase with respect to each other. This means that when material is flowing into the chamber 20 through one of the passages 26, 28, material is also flowing out of the chamber 20 through the other passage during the same period of time. So long as the dispensing member 24 is moving, material is both flowing into the chamber 20 as well as being pushed out of or dispensed from the chamber 20. In this manner, the chamber 20 is filled and emptied at the same time, so as soon as a dispensing operation is completed, the chamber 20 is filled and ready for the next dispensing operation.

As the dispensing member 24, for example, moves upward (as viewed in FIG. 1) towards a first stop position 30, any material in the volume A that is between the dispensing member 24 and the first stop position 30 will be pushed out of the upper passage 26. As the dispensing member 24, for example, moves downward (as viewed in FIG. 1) towards a second stop position 32, any material in the volume B that is between the dispensing member 24 and the second stop position 32 will be pushed out of the lower passage 28. Reference to "upper" and "lower" and variations thereof throughout this disclosure is merely for frame of reference in viewing the drawings, and not meant to imply that the dispensing apparatus 10 requires any particular orientation in use.

An optional adjustment member 34 may be used to allow an operator to change, select or otherwise adjust the amount or volume of material being dispensed during a dispensing operation. For example, the adjustment member 34 may be realized in the form of a pin having a stop end 36 that can be positioned at different locations within the chamber 20 relative to the dispensing member 24. The dispensing member 24 will engage the adjustment member 34, thus limiting the amount of travel or stroke of the dispensing member 24. For maximum volume of material dispensed, the adjustment member 34 may be retracted from the chamber 20 so that the stop end 36 is flush with or slightly recessed from the second stop position 32.

The optional adjustment member 34 therefore allows for very precise and selectable amounts of material to be dispensed. The adjustment member 34 may be realized in the form of a screw or bolt that permits essentially an infinite adjustment of the position of the stop end 36, allowing an operator to adjust the dispense volume from zero cc to the maximum volume of liquid material that the chamber 20 can dispense. In an exemplary embodiment, the chamber 20 holds 8 cc of material, but other size chambers may be used as needed.

The dispensing member 24 preferably although not necessarily is moved using a method of the force applied to the dispensing member by the liquid material being dispensed, which may be supplied under pressure to the chamber 20 from the source 12. The directional control device 18 is used to alternately provide fluid communication between the pressurized material and each of the passages 26, 28 of the chamber 20. The directional control device 18 thus includes an inlet 38 that receives the pressurized material being dispensed.

The directional control device 18 operates in response to a control signal 40 that determines the timing for switching the pressurized material between the two passages 26, 28 of the metering chamber 20. This is schematically illustrated in FIG. 1 by the switching function 42. The switching function 42 operationally directs flow of the material being dispensed between various ports or passages. In the exemplary embodiment, these ports include a common inlet port A that receives pressurized material from the source 12 via a passage E and a common outlet port D that is in fluid communication with a passage F to an outlet 14 arrangement such as a dispensing nozzle (not shown). The switching function 42 further includes first and second directional or distribution ports or passages B and C.

The control signal 40 in this embodiment has first and second states that cause the switching function to have corresponding first and second states. In a first state as represented in FIG. 1, the common inlet port A communicates with the second directional port C that is connected to the lower passage 28 to the chamber 20, thus acting as an inlet to the chamber 20. At the same time, the common outlet port D communicates with the first directional port B that is connected to the upper passage 26 to the chamber 20, thus acting as an outlet from the chamber 20.

When the control signal 40 is in its second state (not shown), the switching function 42 operates to disconnect A from C and connect A to B. At the same time, D is disconnected from B and connected to C. In this second state of the control signal and switching function 42 then, pressurized material flows into the chamber 20 via the upper passage 26 and out of the chamber 20 via the lower passage 28. This switch over feature in an alternating manner is schematically represented by the arrows G and H in FIG. 1.

When the control signal 40 is in a first state (such as illustrated in FIG. 1), pressurized material flows from A to C and into the metering chamber 20 through the lower passage 28. At the same time, the opposite upper passage 26 is basically vented from B to D to the outlet 14 through the control device 18 which is also the directional control device for the outlet 14, so that under the motive force of the pressurized material, the dispensing member 24 is pushed toward the first stop position 30. (upward as viewed in FIG. 1), which causes any material in the upper volume A to be expelled through the upper passage 26 which is functioning as an outlet. By this method and structure, because the pressurized fluid is the driving force acting against the dispensing member 24, as the material in volume A is expelled, material is also at the same time filling the volume B as the dispensing member 24 moves.

When the control signal 40 is in a second state, fluid communication is established between the pressurized fluid and the upper passage 26 which now acts as an inlet to the chamber 20. At the same time, the opposite passage 28 is basically vented to the outlet 14 through the control device 18 which is also the directional control device for the outlet 14, so that under the motive force of the pressurized material, the dispensing member 24 is pushed toward the second stop position 32 (downward as viewed in FIG. 1), which causes any material in the lower volume B to be expelled through the lower passage 28 which is now functioning as an outlet. Because the pressurized fluid is the driving force acting against the dispensing member 24, as the material in volume B is expelled, material is also at the same time filling the volume A as the dispensing member 24 moves. In this manner and method, the dispensing apparatus 10, and in particular the dispensing or metering chamber 20 is always charged and ready for the next dispensing operation at the completion of a current dispensing operation.

It should be noted that the use of a directional control device 18 such as described herein is but one example of many different methods and structures to fill and empty the metering volume 22. For convenience it is noted that port A functionally corresponds to port 164 in FIG. 5A, port B functionally corresponds to the first distribution cavity 114 and the first passage 98 in FIGS. 3 and 4, port C functionally corresponds to the second distribution cavity 116 and second passage 100 in FIGS. 3 and 4, port D functionally corresponds to the outlet port 110 and outlet cavity 112 of FIGS. 3 and 4 and the switching function 42 functionally corresponds to the spool valve arrangement of FIGS. 3 and 4, all of which will be described in greater detail herein below.

The control signal 40 may take any form which will depend on the design and operation of the directional control device 18. In the exemplary embodiments herein, the directional control device 18 may be realized in the form of a spool valve, such as for example, a pneumatically actuated spool valve. In such an embodiment, the control signal 40 may be a pressurized air signal as will be described herein below. But, the directional control device 18 need not be a spool valve and moreover need not be a pneumatically actuated valve. Alternatives include but are not limited to hydraulically or electro-mechanically actuated valves or other control devices such as a solenoid driven valve. Any device or devices may be used to switch the pressurized material between the two passages 26, 28 of the metering chamber 20, such as, for example, in an alternating manner. The directional control device 18 may also provide the common outlet flow path to the outlet 14 (as in the exemplary embodiments herein), although this is not required, but rather the outlet flow path to the outlet 14 may be achieved with a different device or structure other than the directional control device 18. In such an alternative design, multiple devices may be used for such directional flow control, and they will have integrated and synchronized functions, in a sense functioning as a single device, in order to switch out/in flow to the chamber 20 with appropriate connections between the chamber 20 and the supply 12 and the outlet 14.

The control signal 40 may be produced by any suitable control circuit (not shown) such as a control circuit or system used to control overall operation of a dispensing system, production equipment and so forth. For example, in the case of a mixing system, the control signal might be generated from a control circuit or system that not only controls the timing for the dispensing operations but also positioning of various containers, movement of the dispensing apparatus 10 when such is required, and so on. Preferably, although not necessarily, the control signal 40 may switch states in response to a signal that is at least partly a function of each time the dispensing member 24 reaches the first or second stop 30, 32. In the exemplary embodiments herein, a sensor may be provided that detects these events. For example, first and second proximity sensors (not shown in FIG. 1) may be positioned at the first and second stop positions 30, 32 to detect when the dispensing member 24 reaches these positions, thus signaling the end of a dispensing operation. The sensor signals then can be used to indicated that the apparatus 10 is ready to perform the next dispensing operation, causing the control signal 40 to switch states.

Since the metering chamber 20 is filled at the same time it is emptied during a dispensing operation, the apparatus 10 may be operated if so desired to perform continuous dispensing operations without significant delay between operations, other than the briefest delay for the dispensing member 24 to reverse direction (producing what is commonly referred to as "wink"). Thus, the apparatus 10 may be used if so desired to provide a basically continuous dispensing function, however, the apparatus 10 can easily accommodate a waiting period between dispensing operations, for example, if the dispensing apparatus 10 needs to be re-positioned or if a work piece needs to be re-positioned. By using two dispensing apparatus running in tandem with a common outlet, a continuous dispensing function may be realized without any wink during the momentary reversal of direction of the dispensing member 24. The use of the metering chamber as basically a positive displacement pump, provides precise control and repeatability of the volume or amount of material dispensed during each dispensing operation, regardless of changes in viscosity, temperature and so on. The apparatus 10 is well suited for low and high viscosity liquid materials.

As another example, suppose the metering volume 20 has a capacity of 8 cc, but a dispensing operation requires 13 cc of material. The apparatus 10 can easily accommodate this requirement with the following method. The adjustment member 34 may be set so that the adjusted capacity of the chamber is, for example, 6.5 cc, and then double firing the apparatus 10 to dispense a total of 13 cc.

Figure 2:
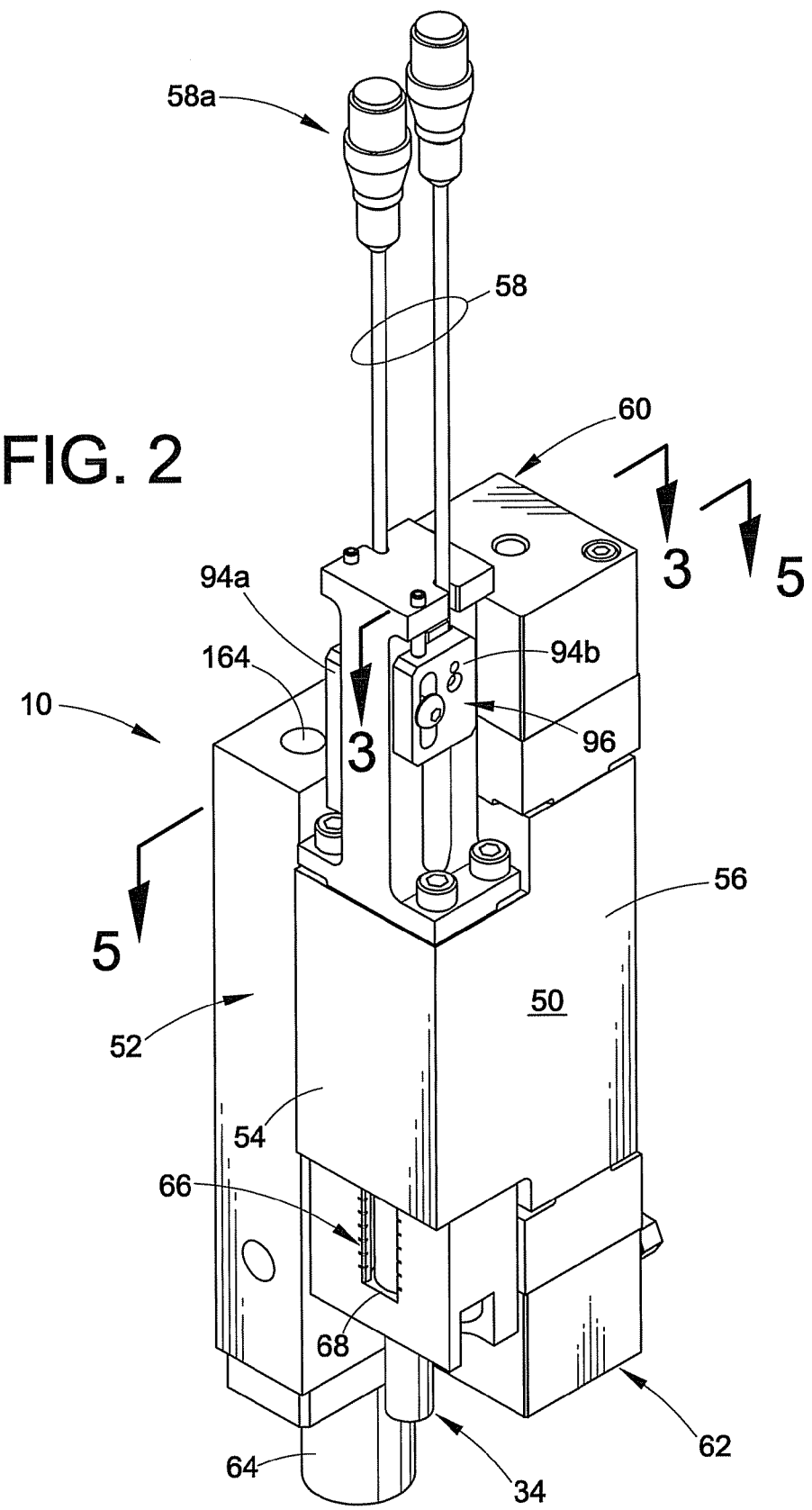
FIG. 2 is a perspective of an exemplary embodiment of a dispensing apparatus such as shown in FIG. 1.

The remaining figures illustrate a more detailed illustration of an exemplary embodiment of the dispensing apparatus 10. With reference to FIG. 2, the overall apparatus 10 may include a dispensing section 50 and an optional manifold section 52. The dispensing apparatus 10 preferably though not necessarily has a modular structure so that various sections may be replaced or maintained as needed, for example. The dispensing section 50 may include a first portion 54 for the dispensing chamber 20 and a second portion 56 for the directional control device 18. Electrical cables 58 with appropriate end connectors 58a may be provided for external access to one or more sensors, such as for example, proximity sensors that indicate position of the dispensing member 24. Opposite end caps 60, 62 provide access ports for pressurized air connections as part of the control signal 40 operation, as will be further explained herein below. The manifold section 52 provides flow passages for pressurized material to the directional control device 18. The manifold section 52 may also provide a dispensing outlet 64 that may accept a dispensing nozzle (not shown) or be in fluid communication with a dispensing nozzle via a hose, connector and so on. In FIG. 2, a portion of the optional adjustment member 34 may be seen, since in these illustrations the adjustment member 34 is in a fully retracted position. A scale or other series of visual demarcations or indicators 66 is provided at a viewing slot or window 68 through which an operator can determine the setting or position of the adjustment member 34, thereby for adjusting the dispensing volume of the apparatus 10. Alternatively, more sophisticated feedback may be used to read and adjust the dispensing volume, including electronic feedback, meters and so on.

Figure 3:
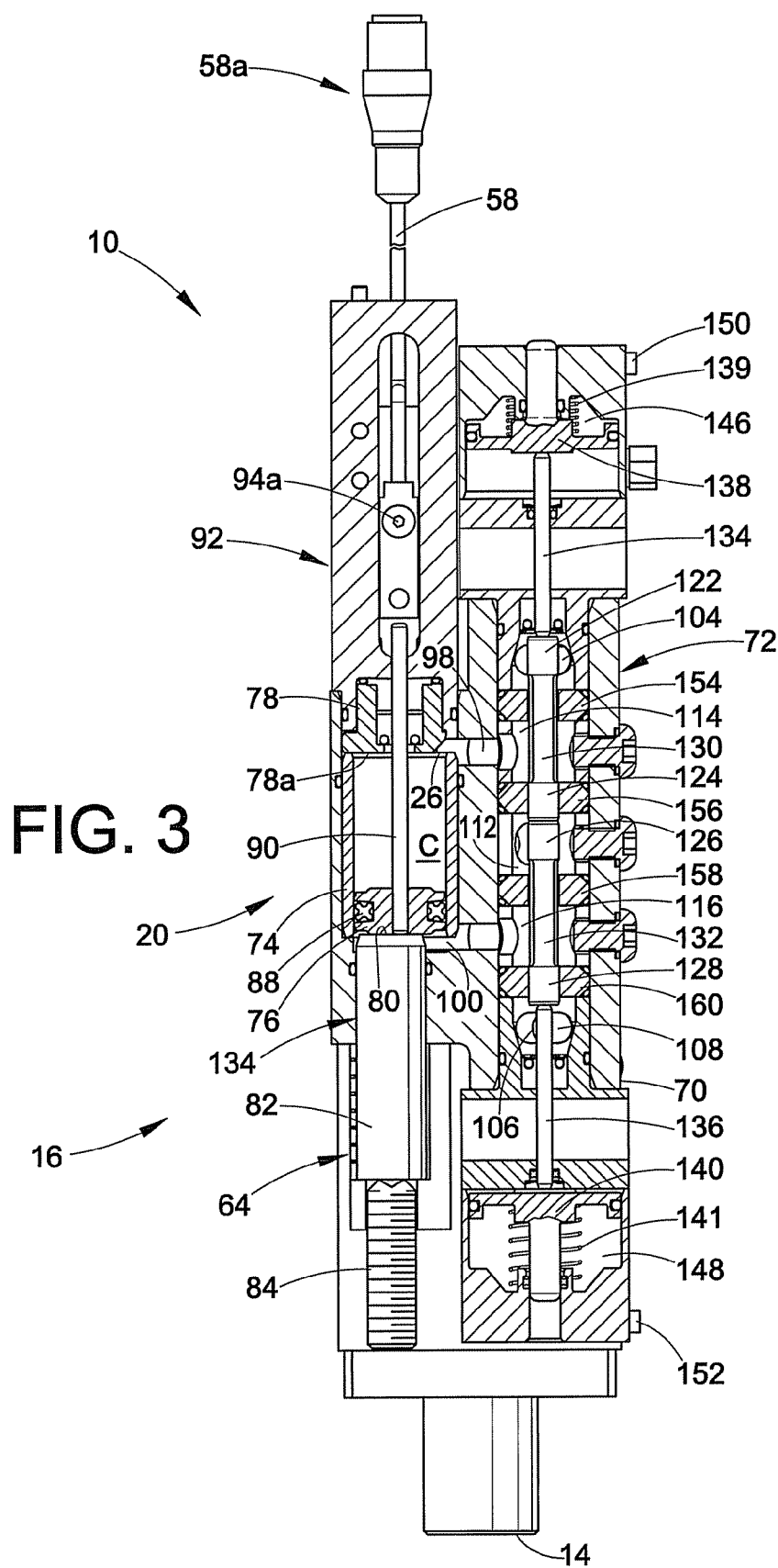
FIG. 3 is an elevation view of the dispensing apparatus of FIG. 2 in longitudinal cross-section along the line 3-3 of FIG. 2, showing a dispensing member in a first position.
Figure 4:
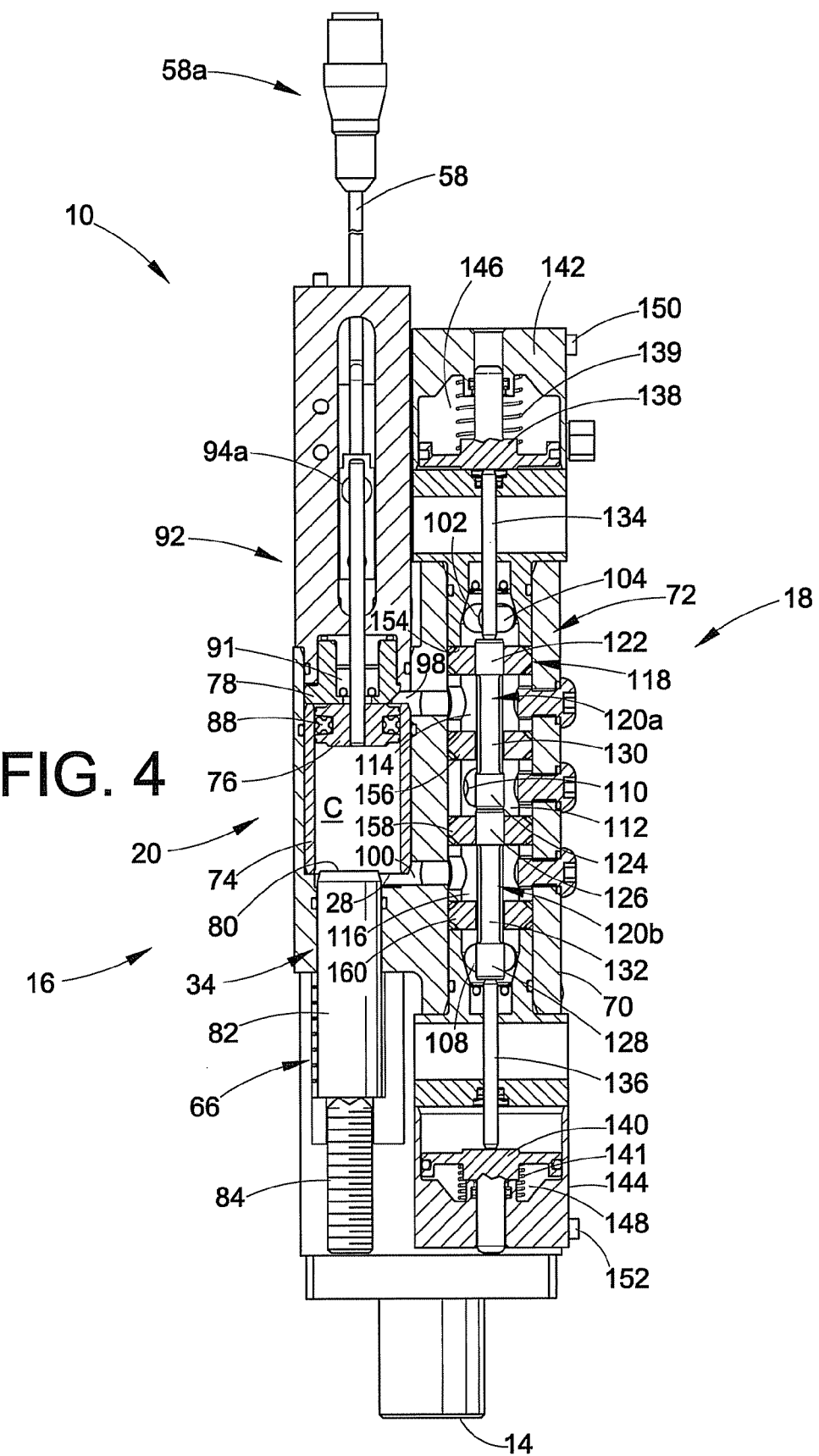
FIG. 4 is an elevation view of the dispensing apparatus of FIG. 2 in longitudinal cross-section along the line 3-3 of FIG. 2, showing a dispensing member in a second position.

With reference to FIGS. 3 and 4, the dispensing apparatus 10 includes a dispenser housing 70 that encloses the directional control device 18 such as, for example, a pneumatically actuated spool valve 72. Also disposed in the dispenser housing 70 is a metering chamber 20 which may be realized in the form of an open cylinder 74. The metering chamber 20 has a dispensing member disposed therein, in this embodiment in the form of an annular piston 76 that moves slideably within the dispensing chamber cylinder 74. Upward movement (as viewed and shown in FIG. 4) of the piston 76 is limited by a lower surface 78a (FIG. 3) of a stop plug or cap 78. Downward movement of the piston 76 (see FIG. 3) is limited by the end face 80 position of the volume adjustment member 34, realized in this embodiment in the form of a stop plug 82 that can be moved axially by rotation of a cooperating device such as a jack screw 84 that may be threaded into the housing 70. In FIGS. 3 and 4, the stop plug 82 is illustrated in its retracted position so that the entire useable volume 22 of the cylinder 74 (minus the volume of the piston 76) is the dispensing volume or amount of material dispensed during a dispensing operation. When the jack screw 84 is turned, its abutting engagement with the stop plug 82 advances axially into the interior space of the cylinder 74 so that the end face 80 may be appropriately positioned to limit the stroke of the piston 76, thereby setting a desired dispensing volume because the stroke of the piston 76 limits how much material is actually dispensed during a dispensing operation.

The piston 76 may be sealed against the interior wall 86 of the cylinder 74 by any suitable seal device or devices. In this embodiment, a conventional quad ring 88 is used. With a single seal element 88 being used, and with full fluid pressure from the liquid material being applied to the piston 76, the piston 76 will move under the force of the pressurized material with almost no pressure loss or reduction of force, less only the drag from the single seal 88.

The piston 76 carries a rod 90 that extends up through the end cap 78 into a sensing section 92. The rod 90 may be sealed against the end cap 78 with a seal 91 (FIG. 4) such as a lip seal. The sensing section 92 houses sensors that detect the position of the rod 90, which corresponds directly to the axial position of the piston 76 within the chamber 74. In this embodiment, two proximity sensor assemblies 94a and 94b (see FIG. 2 as well) may be provided which are partially shown in the drawings. The two sensor assemblies 94 are used to detect the end of the rod 90. When the piston 76 is in the fully up position against the stop 78 (FIG. 4), the rod 90 is detected by both sensor assemblies 94a, 94b. When the piston 76 is in the fully down position against the stop 80 (FIG. 3), the rod 90 is not detected by either sensor assembly 94a or 94b. When the piston 76 is between the stop limits, one of the sensor assemblies will detect the rod 90 and one will not. The sensor assemblies 94 generate appropriate electrical signals that may be used to control operation of the spool or slide valve 72 by indicating when a dispensing operation is completed by signaling that the piston 76 is at one of the stop positions. For alternative embodiments in which the optional adjustment member 34 is used, each of the sensor assemblies 94 may be mounted with an adjustable bracket arrangement 96 (FIG. 2) may be used to adjust the position of the sensors 94 since the piston 76 will not necessarily always have the same stroke after the adjustment member 34 has been set.

The dispensing chamber 74 communicates at one end with a first fluid passage 98 (which functionally corresponds to the first passage 26 of FIG. 1) and the opposite end of the dispensing chamber communicates with a second fluid passage 100 (which functionally corresponds to the second passage 28 of FIG. 1). Pressurized material is selectively fed to each of these passages 98, 100 based on the position of the directional control device 18 in the form of the spool valve 72. When pressurized material passes through the upper or first passage 98, it flows into the dispensing chamber 74 and pushes the piston 76 downward towards the lower stop 80. During this time, the second or lower passage 100 is for all practical purposes vented to the outlet 14, so that material that had previously filled the interior volume 22 (also referenced as "interior volume C" herein) of the dispensing chamber 74 is expelled through the second or lower passage 100 and out through various other passages (to be described below) to the outlet 14. When pressurized material passes through the lower or second passage 100, it flows into the dispensing chamber 74 and pushes the piston 76 upward towards the upper stop 78a. During this time, the first or upper passage 98 is for all practical purposes vented to the outlet 14, so that material that had previously filled the interior volume C of the dispensing chamber 74 is expelled through the first or upper passage 98 and out through various other passages (to be described below) to the outlet 14. In both dispensing operations, since pressurized material is being used to move the piston 76, the chamber 20 re-fills during a dispensing operation and is ready for the next dispensing operation as soon as the current one is completed (completion being indicated by the piston 76 reaching one of the stops 78a, 80 or by some other mechanism).

The dispenser housing 70 further includes the directional control device 18, which in this embodiment may be realized in the form of a spool valve 72. The housing 70 also includes associated porting and passages for the flow of material into and from the metering device 16. A first valve inlet port 102 (FIG. 4) communicates with a source of pressurized material via passages in the manifold section 52 (manifold passages are shown and described with respect to FIGS. 5A and 5B), and opens to a first inlet cavity 104. A second valve inlet port 106 (FIG. 3) communicates with a source of pressurized material via passages in the manifold section 52, and opens to a second inlet cavity 108. A valve outlet port 110 communicates with the outlet 14 via passages in the manifold section 52, and opens to an outlet cavity 112 (FIG. 4). The first fluid passage 98 of the metering chamber 74 opens to a first distribution cavity 114 (FIG. 3), and the second fluid passage 100 of the metering chamber 74 opens to a second distribution cavity 116 (FIG. 3). The various cavities 104, 108, 112, 114 and 116 may be generally annular.

The spool valve 72 further includes a valve member or spool 118, which in the exemplary embodiment includes a two-piece stem 120, having an upper stem portion 120a and a lower stem portion 120b (as viewed in FIG. 4). The two piece arrangement is preferred to simplify journaling the stem portions in the assembly, but a single piece stem could be used as well as additional pieces as needed based on the length of the valve. Each stem portion is configured somewhat like a splined shaft, having generally cylindrical ends 122, 124, 126 and 128 and a spline-like shaft portion or arm 130, 132. The cylindrical ends 124 and 126 contact each other in end to end abutment, and remain in contact during movement of the spool valve 72. The uppermost cylindrical end 122 contacts a first valve pushrod 134 and the lowermost cylindrical end 128 contacts a second valve pushrod 136. The pushrods 134 and 136 are respectively coupled to pneumatic drive pistons 138, 140 that are disposed respectively in piston housings 142, 144. The upper drive piston 138 is disposed in a first piston chamber 146 and the lower drive piston is disposed in a second piston chamber 148. Thus, in one embodiment, the valve member 118 is a multi-piece spool, in this example, four pieces including the two stem portions 120a and 120b, as well as the two pushrods 134 and 136. Alternatives may include more pieces for the valve member (e.g. more stem sections), a single piece valve member, a three piece valve member (such as a single piece stem 120 and the two pushrods) and so on.

Each of the piston chambers 146, 148 include a connection to a source of pressurized air 150, 152. The control signal 40 (FIG. 1) in this example is a pneumatic signal that alternates between the upper connection 150 and the lower connection 152. The pneumatic control signal may be provided from an appropriate control circuit (not shown) such as for example, one or more control valves that feed pressurized air to the two ports 150, 152 at the appropriate times. Each valve chamber 146, 148 may also be vented or evacuated to allow easy valve actuation through the same ports 150, 152. A spring 139 or other suitable bias member is provided on the pressurized side of the upper drive piston 138, and another spring 141 or other suitable bias member is provided on the pressurized side of the lower drive piston 140. These springs help move the spool valve up and down in conjunction with the applied air pressure, as will be more fully explained herein below.

The spool valve 72 further includes bushings 154, 156, 158 and 160 that somewhat journal the valve stem 120, and to provide a fluid tight seal with respective portions of the cylindrical ends 122, 124, 126 and 128 of the spool valve stem 120. Tight tolerances are maintained between the stem 120 and the bushings to effect these fluid tight seals.

By comparing FIGS. 3 and 4, it will be noted that the pneumatic drive pistons 138, 140 cooperate to move the valve member 118 up and down depending on which drive piston is under pressure. Thus in FIG. 3, air pressure has been applied to the lower or second piston chamber 148 which has pushed the lower drive piston 140 upward, thus positioning the valve member 118 in its uppermost position. In FIG. 4, air pressure has been applied to the upper or first piston chamber 146 which has pushed the upper drive piston 138 downward, thus positioning the valve member 118 in its lowermost position. When air pressure is applied to one of the drive pistons, the other drive piston chamber is not pressurized, so that the pistons move each other as well as the valve member 118. The springs 139, 141 provide a biasing force to the pistons 138, 140 to reduce the size of piston needed to move the valve member 118. As will be further explained herein below, the spring bias is available due to the multi-piece structure of the valve member 118.

With reference to FIG. 3, air pressure applied to the lower piston chamber 148 has pushed the associated piston 140 upward (as well as the upper piston 138). This results in positioning the valve stem 120 as illustrated. The lowermost cylindrical end 128 slides with a fluid tight seal into the lowermost bushing 160 to seal and separate the lowermost inlet cavity 108 from the second distribution cavity 116. Therefore, any pressurized fluid presented to the second valve inlet port 106 is prevented from entering the lower or second fluid passage 100 of the chamber 20, so that pressurized fluid at the second valve inlet port 106 is not acting on the piston 76. The cylindrical end 126 on the stem 132 opposite the lowermost cylindrical end 128 slides out of fluid tight seal with its respective bushing 158. This allows fluid communication between the second fluid passage 100 and the outlet cavity 112 and the valve outlet port 110. As the dispensing member or piston 76 moves downward, material flows out of the chamber 20 through the second fluid passage 100 (functioning as an outlet), through the second distribution cavity 116, through a gap between the stem 132 and the bushing 158 (along the splined portion of the shaft 132 as will be further explained below) and out the valve outlet port 110 (FIG. 4). The uppermost cylindrical end 122 has slid out of its respective bushing 154 so that pressurized fluid may pass from the first valve inlet 102, along the splined portion of the stem 130, into the first distribution cavity 114 and the first fluid passage 98 (acting now as an inlet to the chamber 20) so as to act on the piston 76 and drive the piston downward to the position shown in FIG. 3. The cylindrical end 124 opposite the uppermost cylindrical end 122 slides into and seals with its respective bushing 156 to seal and isolate the first distribution cavity 114 from the outlet cavity 112.

With reference to FIG. 4, air pressure applied to the upper piston chamber 146 has pushed the associated piston 138 downward (as well as the lower piston 140). This results in positioning the valve stem 120 as illustrated. The lowermost cylindrical end 128 slides out of a fluid tight seal into the lowermost bushing 160 to provide fluid communication between the lowermost inlet cavity 108 and the second distribution cavity 116. Therefore, any pressurized fluid presented to the second valve inlet port 106 flows through the inlet cavity 108, through the splined portion of the stem 132 into the second distribution cavity 116 and into the second fluid passage 100 (functioning now as an inlet to the chamber 20) to act against the piston 76 and push the piston 76 upwards. The cylindrical end 126 on the stem 132 opposite the lowermost cylindrical end 128 slides into a fluid tight seal with its respective bushing 158 which isolates the second distribution cavity 116 from the outlet cavity 112. As the piston 76 moves upward, material flows out of the chamber 20 through the first fluid passage 98 (functioning now as the outlet of the chamber 20), through the second distribution cavity 116, through a gap between the stem 132 and the bushing 158 (along the splined portion of the stem 132) and out the valve outlet port 110. The uppermost cylindrical end 122 has slid into and seals with its respective bushing 154 to isolate the first valve inlet 102 from the first distribution cavity 114 and the first fluid passage 98. This allows fluid communication between the first fluid passage 98, the first distribution cavity 114, the outlet cavity 112 and the valve outlet port 110. Fluid material is expelled by upward movement of the piston 76 to the position of FIG. 4, with material being forced out of the chamber volume C and flowing through the first fluid passage 98, along the splined portion of the stem 130 and out the outlet port 110. The cylindrical end 124 opposite the uppermost cylindrical end 122 has moved out of engagement with its respective bushing 156 to provide fluid communication between the first distribution cavity 114 and the outlet cavity 112.

In this manner as shown in FIGS. 3 and 4, the spool valve 72 controls whether the pressurized fluid is being applied to push the piston 76 up or down (as viewed in the figures).

Therefore, with simple pneumatic control of the drive pistons 138, 140, the directional control device 18 in the exemplary form of a pneumatic spool valve 72 alternately applies fluid pressure to the metering device 16 so as to push the dispensing member 76 up and down while at the same time filling the chamber with material while material is being dispensed. The metering chamber 74 in its simplest form has two fluid passages that switch function as an inlet and an outlet of the metering chamber 74 depending on the state of the directional control device 18.

Figure 5A:
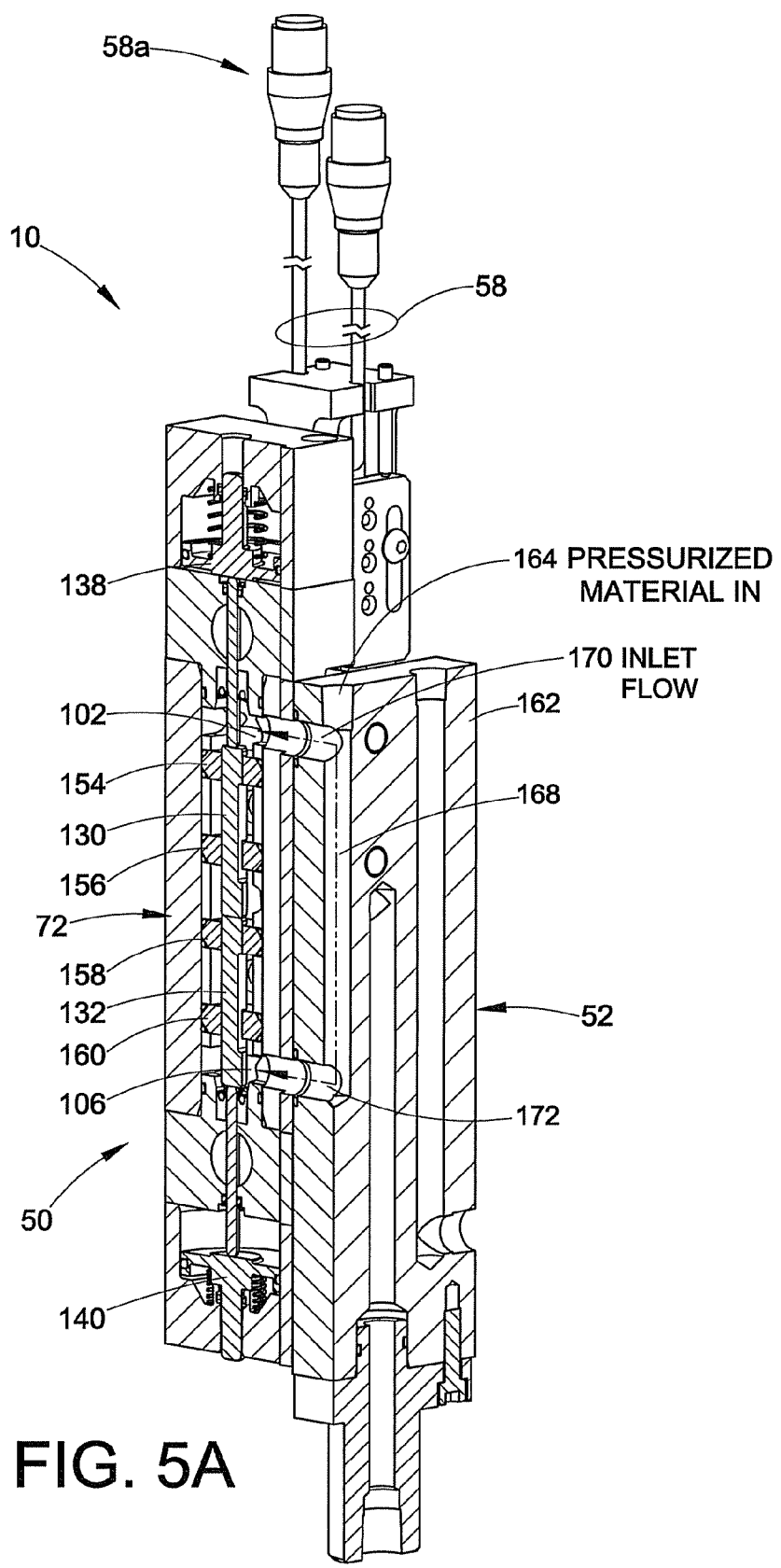
FIGS. 5A and 5B are elevation views of the dispensing apparatus of FIG. 2 in longitudinal cross-section along the line 5-5 of FIG. 2, to show manifold passages.
Figure 5B:
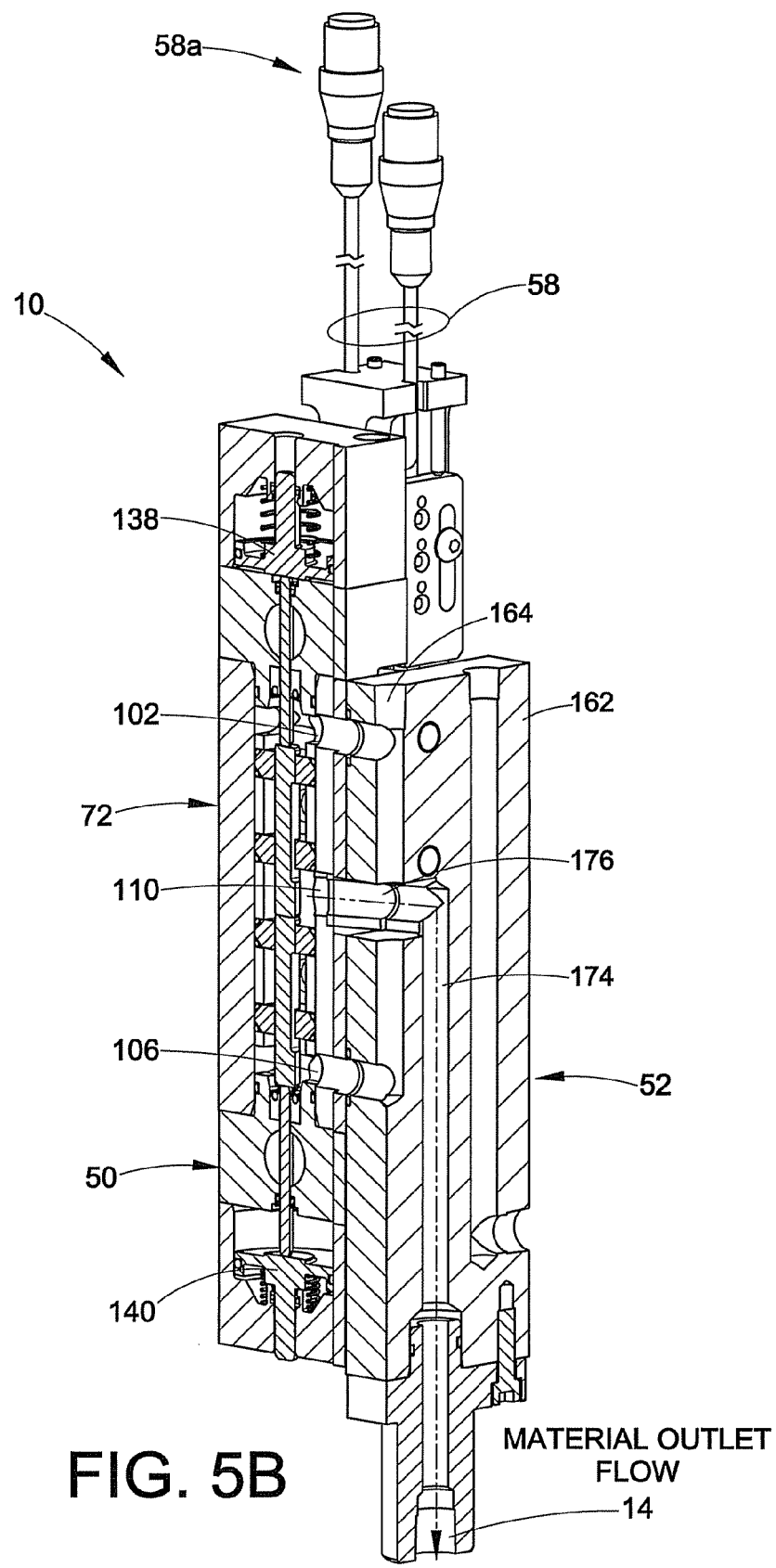

FIGS. 5A and 5B illustrate one of many ways to provide pressurized fluid to and from the metering device 16 and the directional control device 18. In this example, a manifold section 52 includes a manifold block 162. FIG. 5A illustrates inlet flow and FIG. 5B illustrates outlet flow. The manifold block 162 may include a single inlet 164 for admitting pressurized material into the manifold (note that the inlet 164 corresponds functionally to the inlet 38 and port A of FIG. 1). This common inlet 164 communicates with a common feed passage 168. The common feed passage 168 communicates through two passages 170, 172 into the dispensing section 50, and specifically the first and second valve inlet ports 102, 106 respectively. For outlet flow (FIG. 5B), the outlet 14 is in fluid communication with a common outlet passage 174 with a cross-passage 176 into the dispensing section 50, and specifically with the outlet port 110. Note that for both FIGS. 5A and 5B the position of the spool valve 72 corresponds to the position illustrated in FIG. 4.

Figure 6A:
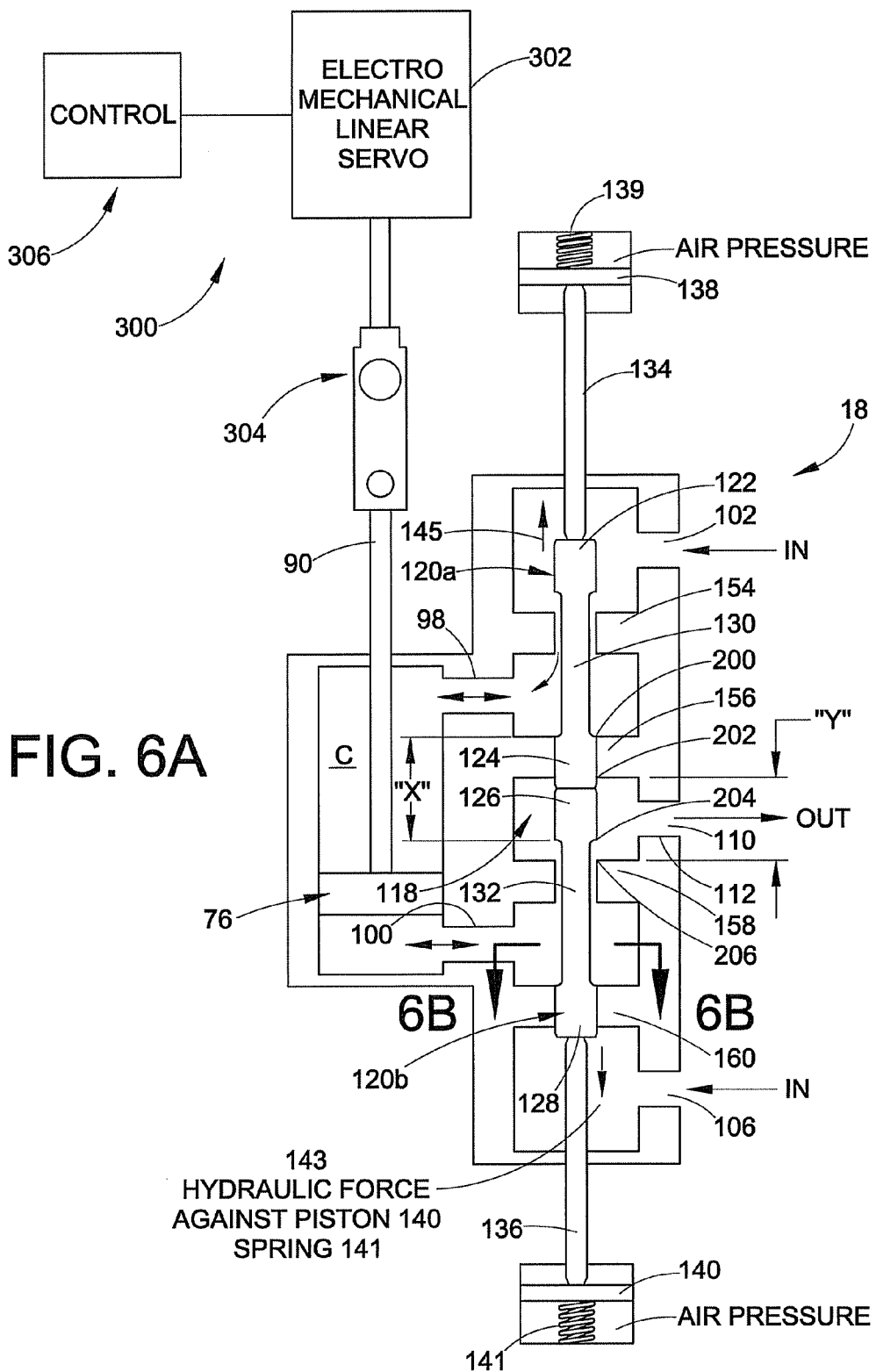
FIG. 6A is a simplified schematic of the directional control device of FIGS. 1, 3 and 4, also showing an alternative embodiment using a servo control.

With reference to FIG. 6A, a simplified schematic of the spool valve 72 operation is provided. This illustration includes the valve member 118 having a two piece stem 120a and 120b. The valve member 118 is moved axially (up and down as viewed in FIG. 6A) by operation of the pneumatic drive pistons 138, 140 and the push rods 134, 136. The pneumatic force is assisted by the respective bias springs 139, 141. The bushings 154, 156, 158 and 160 are shown schematically also.

The position illustrated in FIG. 6A corresponds to the position illustrated in FIG. 3 so that the upper spring 139 is compressed and the lower spring 141 is extended.

The multi-piece stem 120, in this embodiment two sections 120a, 120b, is provided in lieu of a single piece stem to simplify journaling and supporting the stem 120 in the bushings 154, 156, 158 and 160. The four bushings are in a single chamber and lie on a common axis. If the stem 120 were instead a single piece, then the bushings must all be nearly perfectly aligned along the centerline in order to properly seal the stem 120 cylindrical ends as well as to prevent the stem 120 from binding up, for example due to any side load or misalignment. Thus, each stem section 120a, 120b is supported by only two bushings so that the stem shaft defines the centerline. This significantly simplifies assembly and alignment, and is particularly useful to permit tight seal tolerances, such as metal to metal seals (metal bushings and metal stem sections), between the cylindrical ends 122, 124, 126, 128 and their respective bushings 154, 156, 158 and 160.

The push rods 134, 136 abut end to end with their respective cylindrical stem ends 122, 128. This allows fluid pressure from the inlets 102, 106 to act against each push rod to counteract the force of the spring associated with the piston that drives the push rod. For example, fluid pressure at the lower inlet 106 will force the push rod 136 downward. This hydraulic force on the push rod 136 will help overcome the spring bias of the lower spring 141 when air pressure is being applied to the upper piston 138 (keeping in mind the lower piston 140 chamber will be vented). Without the benefit of the hydraulic force, the two springs 139, 141 would simply negate each other. The springs 139, 141 are desirable because they assist the applied air pressure to move the drive pistons 138, 140, thereby allowing for smaller pistons and a smaller package for the dispensing apparatus 10.

Thus, from the position of FIG. 6A, assume air pressure is now applied to the upper piston 138. The lower piston chamber is vented and hydraulic pressure from the liquid material acting on the lower push rod 136 (indicated by arrow 143) overcomes the lower spring 141 bias and the spool valve 72 moves downward. The reverse occurs when moving the spool valve upward with hydraulic force 145 acting against the upper push rod 134. This fluid pressure assist for the spring bias on the pistons 138, 140 thus facilitates movement of the spool valve 72. Note that system fluid pressure is always present at the inlets 102, 106 during normal operation. The cross-sectional area of the push rods 134, 136 may be selected so that the hydraulic force just offsets the associated spring 139, 141 force.

The use of hydraulic pressure from the fluid material at the inlets 102, 106 may be realized as well with a three piece spool valve (not shown) comprising a single piece stem 120 and the two push rods 134, 136. The stem 120 may alternatively have more sections than the two illustrated.

While bearing supported multi-piece shafts may be generally known, that general knowledge does not readily transfer to the spool valve art, as I found that use of the multi-piece stem 120 in the spool valve introduces the hydraulic pressure characteristic that would actually necessitate a larger piston and/or increased air pressure (which often is limited in practical use to shop air). Also, while spring assisted air pistons may be generally known, again this knowledge does not readily transfer to a double end driven spool valve because by themselves the springs would negate each other. But in my exemplary embodiment, use of the springs helps to overcome this hydraulic force and thus permits the designer to take advantage of the hydraulic pressure while keeping the piston size smaller than would otherwise be required. There is a synergy realized by use of the springs with the hydraulic force acting on the valve member 118 during movement of the spool valve. Thus, while one of the springs is extending (adding to the pneumatic force acting on its associated piston) and helping compensate for the hydraulic force acting on its associated pushrod, at the same time the hydraulic force acting on the opposite pushrod is being advantageously used to overcome the spring force for the spring being compressed by the opposite piston.

With continued reference to FIG. 6A, another optional feature is presented which may eliminate the wink effect in the output or dispensed flow caused by the piston 76 reversing direction after each dispense operation. Noted on FIG. 6A is a dimension X between the inner cylindrical ends 124, 126, and a dimension Y between facing seal ends of the inner bushings 156, 158 that encompass the outlet port 110. If the dimensions are such that X>Y, then the outlet 110 is always isolated from inlet pressure of the liquid material presented at inlets 102 and 106. This is the arrangement for the exemplary embodiments herein.

On the other hand, if the dimensions were such that X<Y (not shown) then the seal point 200 of the cylindrical portion 124 against the bushing seal point 202 will open before the seal point 204 of the other cylindrical portion 126 seals against the other bushing seal point 206. This will momentarily connect or cross-over input pressure and flow from inlet 102 directly to the outlet 110. This cross-over flow can be used to wash out or negate the wink that otherwise occurs for the isolated output when X>Y. Although this momentary condition produces and unmetered quantity to the outlet, this effect can be minimized by adequate control of speed of movement of the spool valve.

Figure 6B:
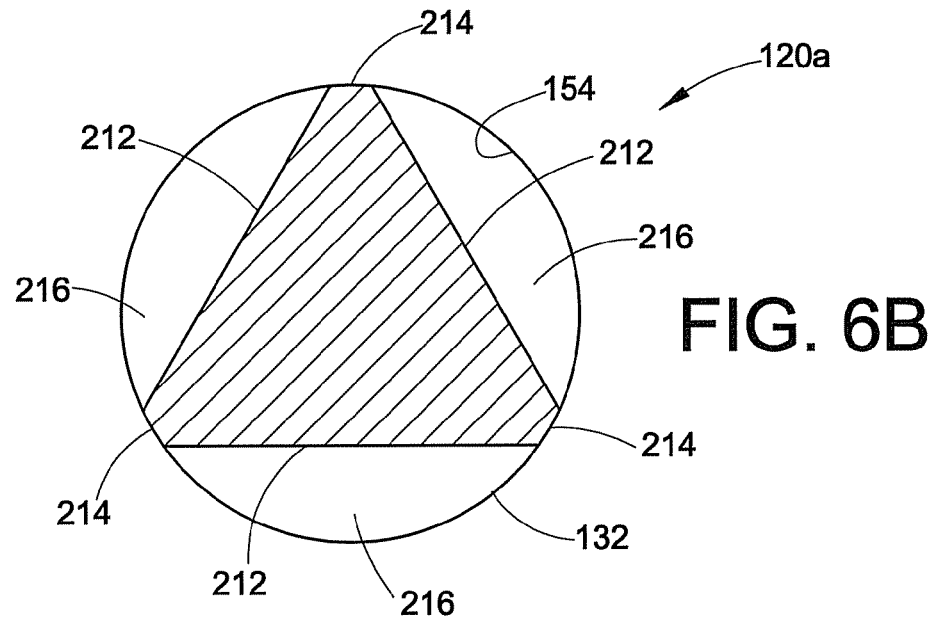
FIG. 6B is a cross-section view of a central portion of a stem section take along line 6B-6B of FIG. 6A.
Figure 6C:
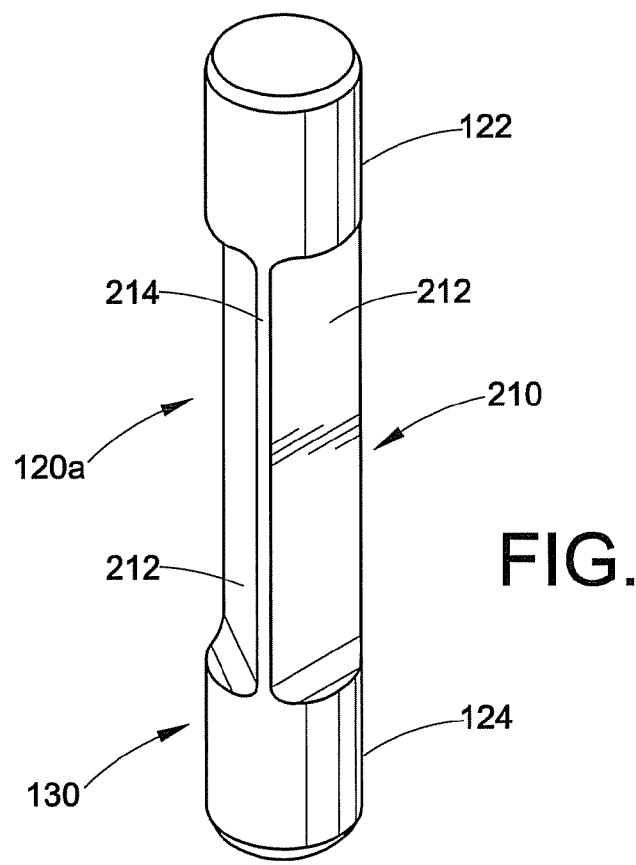
FIG. 6C is a perspective of an embodiment of a spool valve stem.

With reference to FIGS. 6B and 6C, in the exemplary embodiments herein each stem section 120 (FIGS. 6B and 6C illustrate one of the two stem sections used in the two piece stem embodiment of FIGS. 3 and 4) is a generally cylindrical shaft having opposed cylindrical ends 122, 124. A central portion 210 is formed much like a spline in that recesses 212 are formed. In this example, three recesses 212 are provided, leaving three arcuate ridges 214. These ridges 214 maintain contact between the stem shaft 130 and the associated bushings when the spool valve 72 is moved axially thus keeping the stems 120 centered in the bushings. This is particularly useful for tight tolerance metal to metal seals between the bushings and the cylindrical ends of the stems. The recesses 212 result in grooves 216 that allow fluid material to flow along the shaft and through the center of the bushing. Note FIG. 6B includes a bushing interior wall, such as for example for the bushing 154 in FIG. 3.

One of the features of the pressure based embodiments of FIGS. 3 and 4 is that the material flow rate of dispensing may vary as a function of system pressure, viscosity, seal drag and so on. Even though the quantity of material is precisely metered, the rate at which it is dispensed may vary. Accordingly, the apparatus 10 is highly desirable for discrete quantity dispensing, but does not operate with known control of the rate of dispensing. With reference again to FIG. 6A, in another alternative embodiment, the sensing section 92 may be replaced with a rate mechanism, for example, a dispensing rate control arrangement 300. In the exemplary embodiment of FIG. 6A, the dispensing rate control arrangement 300 may be realized in the form of a servo-motor, although any other arrangement may be used as needed in order to effect control of the rate of travel of the dispensing member 24, and hence the dispensing rate of material from the dispensing apparatus.

The use of a servo-motor provides one approach for not only having a precisely metered quantity of material but also a controlled dispense rate. Rather than (or alternatively in addition to) the use of the sensors 92 (which detect when the dispensing member 24 reaches its stops but not how quickly the dispensing member 24 travels), a servo-motor or other electromechanical, pneumatic or hydraulic device may be used not only to determine when the dispensing member 24 has completed its travel during a dispensing operation, but also may be used to control the rate at which the member 24 travels and hence the rate at which liquid material is dispensed.

In the exemplary embodiment of FIG. 6A, a servo-motor 302 is operably connected by a suitable coupling mechanism 304 to the piston rod 90 that travels with the dispensing member or piston 76. The primary motive force on the piston 76 is the fluid pressure of the liquid material from the supply 12 (FIG. 1) as in the other embodiments described herein, and the control device 18 may function in a similar manner to control directing pressurized fluid to the first fluid passage 98 or the second fluid passage 100 into and out of the chamber 20. However, in this case the pneumatic control signal 40 (FIG. 1) will now change states in response, for example, to a position based signal from a servo-motor control circuit 306 that indicates when a dispensing operation has completed. This position based signal may be a hard signal such as from a position or proximity sensor, or may be a "soft" signal such as generated by the software control of the servo-motor because the control circuit 306 precisely determines the position of the dispensing member 24 based on the precisely known position of the servo-motor 302. For example, the control circuit 306 may issue the direction change signal 40 to the control device 18 at the same moment that the dispensing member 24 direction is changed (FIG. 1). The control circuit 306 may also or alternatively generate the control signal 40 for the control device 18 based on acceleration and deceleration information based on the operation of the servo-motor 302. The servo-motor 302 and related control circuit 306 may be any suitable device well known to those skilled in the art. The control circuit 306 is typically available with the motor 302. One example of a suitable servo-motor system is a rotary to linear actuator series (for example, the TRITEX™ Series) available from EXLAR Corporation, Chanhassen, Minn.

As noted, fluid pressure is the primary motive force that moves the piston 76 during a dispensing operation (i.e. each travel of the piston 76 from end to end of the chamber 20, or multiple travels). Accordingly, the servo-motor 302 may function as an electromechanical brake on the piston 76 so as to assure that the piston 76 travels at a desired rate and thus effects a desired dispense rate. As is well known, the servo control 306 determines the servo-motor linear position very accurately. With this embodiment then, this information then can be directly correlated to the piston 76 position to determine start and finish of a dispensing operation.

The servo-motor control 306 may generate an appropriate control signal to cause the spool valve 72 pneumatics to switch directional movement of the spool valve at the end of a dispense operation. Alternatively, sensors (not shown) may be used to detect when the spool valve 72 has reached its end of travel, and generate a signal to the servo-motor control 306 to release the piston 76 for movement of the next ensuing dispensing operation. Because the servo-motor embodiment is insensitive to pressure (presuming adequate inlet pressure to the spool valve 72), this embodiment may be used to produce a dispensing operation having a controlled or metered volume with a controlled dispense rate with near continuous dispensing if so needed. Even though there may still be wink between each dispensing operation as the piston 76 reverses direction, this wink may be minimized or eliminated, for example, by using a longer outlet path (such as a longer hose) from the dispenser 10 to a nozzle, or as another example using the cross-over feature of X<Y described herein above. Particularly in an alternative embodiment that uses a controlled position and travel rate of the piston 76 (such as for example the servo-motor embodiment herein), the cross-over feature is useful because the duration of the cross-over can be precisely known and controlled with the servo-motor to minimize any effects from the momentary "unmetered" amount of liquid material dispensed during the cross-over time when one of the inlets is directly connected to the outlet (in FIG. 1 for example, the condition X<Y would be realized by a momentary connection between A and D).

As another alternative embodiment, rather than the servo-motor, a pressure regulator (400 shown in phantom in FIG. 1) may be used to control the pressure of the liquid material from the supply 12 that acts against the dispensing member 24 (FIG. 1). By controlling the pressure (to offset changes in viscosity for example), in effect the piston 76 will travel at a controlled rate, and the sensors 94 may be used as in the embodiment of FIGS. 3 and 4 herein to cause the spool valve 72 to switch direction. This alternative arrangement in effect provides a piston type flow meter.

Figure 6D:
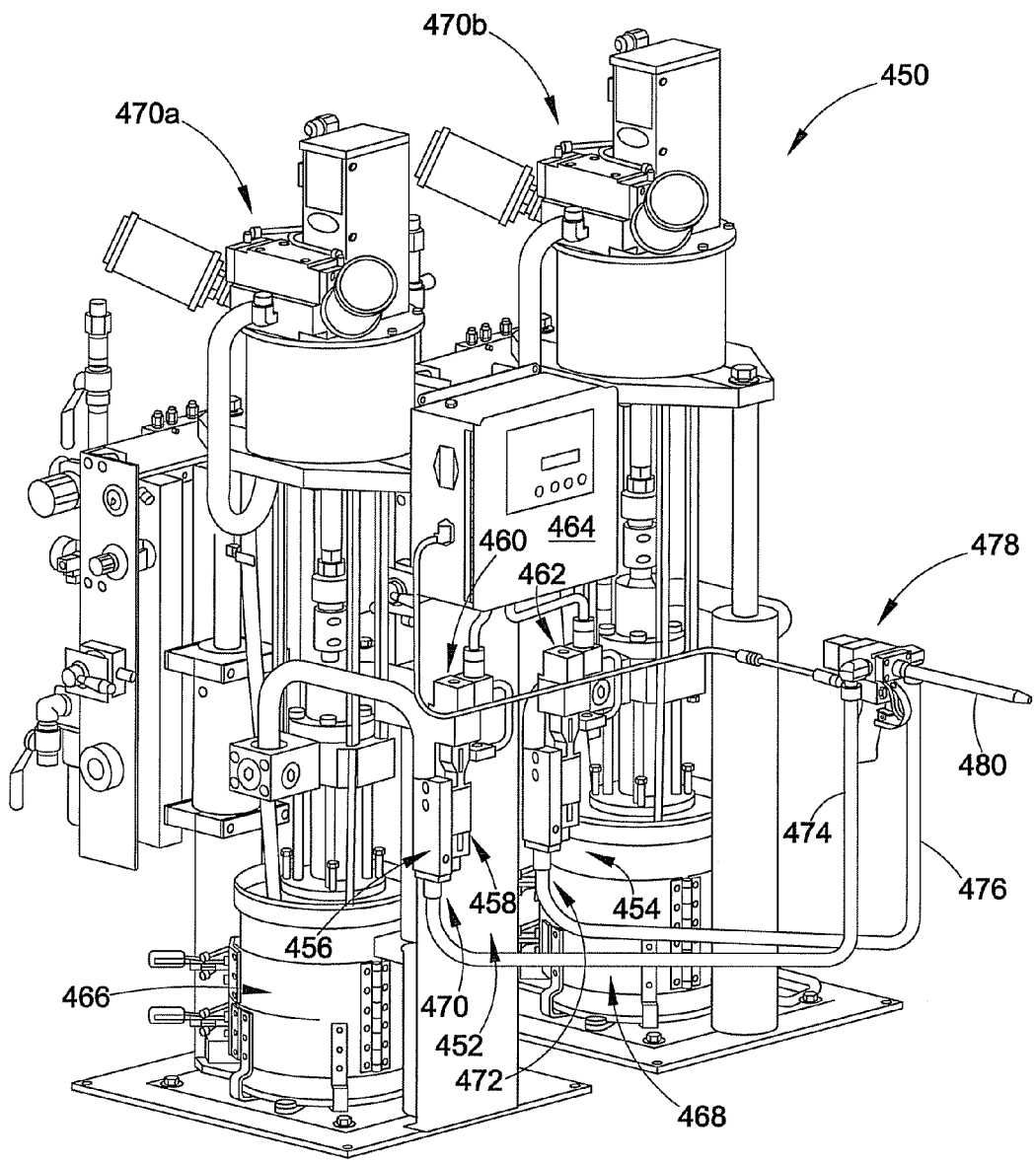
FIG. 6D is another embodiment for a two component dispensing apparatus.

With reference to FIG. 6D, a two component dispensing apparatus or system 450 is illustrated. In this embodiment, the system 450 may utilize two dispensing apparatuses 452, 454 which individually may be similar to the dispensing apparatus 10 of the embodiments described herein above. Thus, each dispensing apparatus 452, 454 may include a control device 456 and a metering device 458 (in FIG. 6D the control device 456 is indicated as including the optional manifold arrangement along with the control device 18 that is not visible in FIG. 6D). Also, this two component system 450 may use two dispensing rate control arrangements 460, 462, similar to the embodiment of FIG. 6A herein, for example servo-motors or stepper motors, to control the dispensing rate of each material. The motors 460, 462 may share a common control system 464. An advantage of the two dispensing rate control arrangements 460, 462 of FIG. 6D is that the control system 464 may be used to independently control the dispensing rates of the two materials. This independent control of the dispensing rates may thus be used to control or select a mix ratio of the two components that are subsequently mixed together. The dispensing rates may be controlled to achieve the desired mix ratio while compensating for differences in compressibility of the two materials, differences in viscosity, pressure differences and so on. Alternatively, in other systems it may not be necessary to have independent control of the dispensing rates for the two dispensing apparatuses 452, 454, but instead the control system 464 may operate the dispensing apparatuses 452, 454 to operate at the same rate.

Use of an arrangement for controlling the dispensing rate of the coating material, for example, the use of a servo-motor or stepper motor, may facilitate the FIG. 6D embodiment. Without rate control over the speed of movement or displacement of the dispensing member 24, it may be more difficult to precisely or accurately control—to the extent of the accuracy desired—the mix ratio of the two materials. This difficulty may arise due to changes in viscosity, inlet pressure, temperature and so forth of the materials being dispensed and mixed.

As another alternative embodiment, a single dispensing rate control arrangement, such as a single servo-motor or stepper motor for example, may be used to control the dispensing rates of the two materials. Such a configuration may be used, for example, when the ratio of the two materials is predetermined and fixed. In such cases, for example through appropriate gearing or displacement adjustments (for example, the position of the displacement adjustment member 34), the two metering devices 458 may be driven by a single motor but dispense at different rates to achieve a predetermined fixed ratio. The ratio is fixed in the sense that to change or select a different ratio one would adjust the gearing, or adjust the position of one or both displacement adjustment members 34 (FIG. 1), in order to change the ratio of the two materials. This would be in contrast, for example, with using two separate dispensing rate control arrangements 460, 462 (as in FIG. 6D) whereby the ratio of the two materials can be selected and changed by programmable changes via the control 306 to adjust or change the dispensing rate of one or both metering devices 458.

In the overall system 450, a first supply 466 may be used for a first component and a second supply 468 may be used for a second component. A typical example of a two component system is a two component epoxy used as a filler material or as an adhesive, for example. Respective pumps 470a, 470b may be used to deliver each component from its respective supply 466, 468 to the inlet 164 (see FIGS. 2 and 5A) of the respective dispensing apparatus 452, 454. Each dispensing apparatus 452, 454 has a respective output 470, 472 connected by transfer hoses 474, 476 to a mixing station 478. Alternatively, the transfer hoses may deliver the two component materials to a hand gun that mixes the materials together prior to application to a surface. The mixing station 478 may be, for example, a static mixing station that uses a mixer element 480 to combine the two components prior to application. The mixer element 480 may be used as a nozzle to deliver the mixed components to an application surface, or the mixer element 480 may be adapted to a flexible hose to transfer the mixed material to a nozzle at a remote location.

The two component embodiment of FIG. 6D may easily be extended to more than two components by simply adding more dispensing units and designing the desired control for the dispensing rates to achieve the desired mix ratios.

The inventions have been described with reference to the exemplary embodiments. Modifications and alterations will occur to others upon a reading and understanding of this specification. It is intended to include all such modifications and alterations insofar as they come within the scope of the appended claims or the equivalents thereof.

Having thus described the invention, we claim:

1. Dispensing apparatus for liquid material comprising:

a metering chamber and a dispensing member disposed in said chamber, said chamber having first and second material passages in fluid communication with corresponding first and second cavities extending to corresponding first and second inlet ports, said dispensing member being moveable between first and second positions in an alternating manner to dispense material from said first and second material passages through an outlet port in fluid communication with a third cavity between the first and second cavity, with material flowing out said first material passage as said dispensing member moves toward said first position and said material flowing out said second material passage when said dispensing member moves toward said second position, said dispensing member moving in response to fluid pressure at said first and second material passages such that when one of said material passages is acting as an inlet for the chamber, the other material passage acts as an outlet for the chamber; and an adjustment member extending into the metering chamber and including a stop portion adjustably positionable within the metering chamber to selectively define the second position of the dispensing member.

2. The apparatus of claim 1 wherein said dispensing member comprises a piston.

3. The apparatus of claim 2 wherein said piston comprises a circumferential piston seal that is a dynamic seal between said piston and said metering chamber.

4. The apparatus of claim 1 wherein said dispensing member moves toward said first position in response to fluid pressure of material from said first material passage acting against said dispensing member, and said dispensing member moves toward said second position in response to fluid pressure of the material from said second material passage acting against said dispensing member.

5. The apparatus of claim 1 wherein as said dispensing member moves toward said first position, material enters said metering chamber from said first material passage to fill said metering chamber and drive said dispensing member to said first position.

6. The apparatus of claim 5 wherein as said dispensing member moves toward said second position, material enters said metering chamber from said second material passage to fill said metering chamber and drive said dispensing member to said second position.

7. The apparatus of claim 1 wherein the adjustment member is positionable relative to said dispensing member to select volume of material dispensed with each stroke of said dispensing member.

8. The apparatus of claim 1 comprising a sensing device that signals when said dispensing member reaches said first or second position.

9. The apparatus of claim 1 comprising a material control device that delivers a source of pressurized material to said first and second material passages in response to a control signal.

10. The apparatus of claim 9 wherein said material control device comprises a valve having first and second valve positions, with pressurized material flowing to said first material passage when said valve is in said first valve position, and pressurized material flows to said second material passage when said valve is in said second valve position.

11. The apparatus of claim 10 wherein said material control device comprises a spool valve.

12. The apparatus of claim 10 wherein said material control device operates in response to air pressure that alternately moves said valve between said first and second valve positions.

13. The apparatus of claim 9 wherein said control signal is a pressurized fluid or an electrical signal, said control signal is alternately applied to said control device to switch said source of pressurized material to said first and second material passages.

14. The apparatus of claim 2 wherein said piston comprises a detectable member that is detected by a sensing member to signal when said piston is at said first and second positions.

15. The apparatus of claim 14 wherein said sensing member comprises a proximity sensor.

16. The apparatus of claim 9 wherein said control signal is a function of a sensor signal that indicates when said dispensing member is at said first or second position.

17. The apparatus of claim 3 wherein full fluid pressure is applied to said piston to apply a corresponding force to said piston less only drag from said piston seal.

18. The apparatus of claim 9 wherein said material control device provides a single material outlet for dispensed material.

19. The apparatus of claim 18 comprising a dispensing nozzle connected to said single material outlet.

20. The apparatus of claim 13 wherein pressurized fluid is hydraulic or pneumatic.

21. The apparatus of claim 13 wherein an electrical control signal operates a solenoid.

22. The apparatus of claim 1 comprising a rate mechanism that controls speed of said dispensing member as said dispensing member travels between said first and second positions.

23. The apparatus of claim 22 wherein said rate mechanism comprises a servo-motor.

24. The apparatus of claim 1 comprising a pressure regulator that controls pressure of the fluid material acting on said dispensing member, so that the apparatus functions as a piston driven flow meter.

25. The apparatus of claim 1 comprising a second metering chamber, said first and second metering chambers comprising respectively first and second dispensing members for dispensing first and second materials, and a mixing apparatus for combining the first and second materials for application to a surface.

26. The apparatus of claim 25 wherein said first and second dispensing members dispense material at different rates based on a desired mixing ratio.

27. The apparatus of claim 25 comprising a rate mechanism that controls said first and second dispensing members as said dispensing members travel between said first and second positions so as to produce a predetermined mix ratio of the first and second materials.

28. The apparatus of claim 25 comprising first and second rate mechanisms that respectively control said first and second dispensing members as said dispensing members travel between said first and second positions so as to produce a selectable mix ratio of the first and second materials.

29. Dispensing apparatus for liquid material, comprising:
a metering chamber and a dispensing member disposed in said chamber, said chamber having first and second material passages in fluid communication with corresponding first and second cavities extending to corresponding first and second inlet ports, said dispensing member being moveable between first and second positions to dispense material from said first and second material passages through an outlet port in fluid communication with a third cavity between the first and second cavity, and
a control device having a valve member extending through the first, second, and third cavities and axially movable between a first state and a second state and including first, second, and third sealing portions;
wherein when the valve member is in the first state, the first sealing portion blocks flow between the first inlet port and the first cavity and the third sealing portion blocks flow between the second cavity and the outlet cavity, to direct flow from the first material passage to the outlet port and to direct flow from the second inlet port to the second material passage; and
when the valve member is in the second state, the second sealing portion blocks flow between the second inlet port and the second cavity and the third sealing portion blocks flow between the first cavity and the outlet cavity, to direct flow from the second material passage to the outlet port and to direct flow from the first inlet port to the first material passage.

30. The apparatus of claim 29 wherein material flowing from said material passages flows through a common orifice in said control device.

31. The apparatus of claim 29 wherein said control device alternately delivers pressurized material to said first and second material passages.

32. The apparatus of claim 29 wherein said valve comprises a spool valve.

33. The apparatus of claim 29 wherein said control device switches state in response to a control signal.

34. The apparatus of claim 33 wherein said control signal comprises pressurized fluid or an electrical signal.

35. The apparatus of claim 29 comprising an adjustment member that is positionable relative to said dispensing member to select volume of material dispensed.

36. The apparatus of claim 35 wherein said adjustment member is positionable on a continuum.

37. The apparatus of claim 29, wherein the third seal portion of the valve member is configured such that when the valve member is in an intermediate position between the first and second positions, the third sealing portion of the valve member blocks flow between the first cavity and the outlet cavity and blocks flow between the second cavity and the outlet cavity, to temporarily block all fluid flow to the outlet port.

* * * * *